US012158431B1

(12) United States Patent
Dean et al.

(10) Patent No.: US 12,158,431 B1
(45) Date of Patent: Dec. 3, 2024

(54) METHOD AND TEST KIT FOR DETECTING COPPER IN A LIQUID HYDROCARBON

(71) Applicant: Precision Combustion, Inc., North Haven, CT (US)

(72) Inventors: Robert W. Dean, Enfield, CT (US); Codruta Maria Zoican-Loebick, North Haven, CT (US)

(73) Assignee: PRECISION COMBUSTION, Inc., North Haven, CT (US)

( * ) Notice: Subject to any disclaimer, the term of this patent is extended or adjusted under 35 U.S.C. 154(b) by 50 days.

(21) Appl. No.: 17/841,768

(22) Filed: Jun. 16, 2022

Related U.S. Application Data

(60) Provisional application No. 63/219,209, filed on Jul. 7, 2021.

(51) Int. Cl.
*G01N 21/78* (2006.01)
*C10L 1/10* (2006.01)

(52) U.S. Cl.
CPC ............... *G01N 21/78* (2013.01); *C10L 1/10* (2013.01); *C10L 2200/043* (2013.01)

(58) Field of Classification Search
CPC ........... G01N 33/2829; G01N 33/2835; G01N 33/2858; G01N 31/22; G01N 21/78
See application file for complete search history.

(56) References Cited

U.S. PATENT DOCUMENTS

2004/0009194 A1* 1/2004 Andrieu .................. A61K 39/12
514/220

OTHER PUBLICATIONS

Q. Lu, et al., "Rapid Determination of Dissolved Copper in Jet Fuels Using Bathocuproine," Energy & Fuels, (2003), 17, 699-704 Abstract Only.
D. Puranik, et al., "Copper Removal From Fuel by Solid-Supported Polyamine Chelating Agents," Energy Fuels, (1998) 12, 4, 792-797 Abstract Only.
F.A Cotton and G. Wilkinson, "First Transition Series Elements," Advanced Inorganic Chemistry, John Wiley & Sons, Inc., New York, 4th edition (1980) 819.
W.E. Keyes, John B.R. Dunn, Thomas M. Loehr, "A Water-Stable Cu(III) Complex," Journal of the American Chemical Society 99:13, (1977) 4527-4529.
"Neil F. Curtis, et al., ""Crystal and Molecular Structure of Di-μ-[4,6,6-trimethyl-3,7-diazanon-3-ene-I ,9-diolato(I-)-ONN', u-O'1]-dicopper( 11) Diperchlorate,"" J.C.S. Dalton (1977) 1051-1055".
G.R. Clark, B.W. Skelton, T.N. Waters, "Structure of the Oxygenated Condensation Product Between Copper (II) Ions, Oxalodihydrazide, and Acetaldehyde," Journal of the Chemical Society, Chemical Communications (1972) 1163.
R.N. Beale, D. Croft, "The Microdetermination of Biological Copper with Oxalyldihydrazide," Journal of Clinical Pathology (1964) 17, 260-263.

* cited by examiner

*Primary Examiner* — Prem C Singh
*Assistant Examiner* — Brandi M Doyle
(74) *Attorney, Agent, or Firm* — Marie Zuckerman; Andrew D. Gathy

(57) ABSTRACT

A colorimetric method for detecting copper in a liquid hydrocarbon, preferably, a liquid hydrocarbon fuel, in particular an aviation fuel. A test kit for use in administering the test method is also described.

16 Claims, 2 Drawing Sheets

METHOD AND TEST KIT FOR DETECTING COPPER IN A LIQUID HYDROCARBON

CROSS-REFERENCE TO RELATED APPLICATIONS

This application claims benefit of U.S. provisional application No. 63/219,209, filed Jul. 7, 2021.

GOVERNMENT RIGHTS

This invention was made under U.S. contract no. N68335-20C-0182, sponsored by the Department of Defense. The U.S. government holds certain rights in this invention.

FIELD OF THE INVENTION

This invention pertains to a method of detecting copper in a liquid hydrocarbon, more particularly, copper contamination in a liquid hydrocarbon fuel, for example, an aviation jet fuel. In another aspect, this invention pertains to a test kit for use in administering the copper detection method.

BACKGROUND OF THE INVENTION

Copper contamination in hydrocarbon fuels derives from the use of copper-nickel (Cu—Ni) tanks for fuel storage and Cu—Ni piping for fuel transportation and delivery. Contamination levels as high as 1,000 parts per billion (1,000 ppb) have been reported; for example, see D. Puranik, Y. Guo, A. Singh, A. Huang, L. Salvucci, R. Kamin, V. David, and E. Chang, in Energy & Fuels 12, 792, (1998). Copper dissolved in hydrocarbon fuels impacts combustion engine performance due to copper's catalytic effect on fuel decomposition, which leads to coke, gums, and sediments that reduce engine performance capability.

Detection of copper contamination in hydrocarbon samples at copper concentrations in the parts per billion level generally requires trained analysts and specialized equipment, such as inductively coupled plasma mass spectrometry (ICP-MS) or atomic absorption spectroscopy (AA). These trained analysts and sophisticated analysis methods are not available for in-field use, for example, onboard naval ships and carriers where fighter jets are refueled or on any other sea or land-based refueling location.

One method for measuring copper contamination in a hydrocarbon fuel was disclosed by Q. Lu, J. Wei, G. Collins, R. Morris, P. Serino, Y. Guo, in Energy & Fuels, 17, (2003), 699. As described therein, the contaminated fuel sample is treated with a mixture of bathocuproine and a reducing agent, such as ascorbic acid or hydroquinone, to produce a Cu (I)-bathocuproine complex with an adsorption maximum at 474 nanometers (nm). The method works well for copper-contaminated pure hydrocarbon fuel surrogates, like dodecane and hexane, but is not satisfactory for actual fuel samples, like jet fuels. The poor outcome with actual fuels is likely due to chelators that are added to fuels, for example, MDA ("Metal Deactivating Additive," N, N'-Disalicylidene-1,2-propanediamine), which apparently bind copper more strongly than the detection reagent bathocuproine. Another drawback to the bathocuproine method relates to the proximity of the maximum absorption wavelength at 474 nm to a yellow color commonly found in fuel samples (ca. 400-460 nm) making the color change due to reaction with copper difficult to detect in field testing. Accordingly, the bathocuproine method is subject to absorbance interference, which then disadvantageously requires use of an identical fuel sample albeit unreacted as a reference blank.

In a publication entitled "Microdetermination of Biological Copper with Oxalyldihydrazide," Journal of Clinical Pathology, 17 (1964), 260-263, R. N Beale and D. Croft disclose a colorimetric determination in aqueous medium of microgram quantities of biological copper extracted from serum and tissues. As described, the method involves formation of an intensely violet (red-blue)-colored oxalyldihydrazide (OXDH)-acetaldehyde complex with copper. The complex has an absorbance maximum at 542 nm (mid-green absorption) with high molar extinction coefficient of about 23,000.

In a publication entitled "A Water-Stable Cu(III) Complex" by William E. Keyes, John B. R. Dunn, and Thomas M Loehr, Journal of the American Chemical Society, 99:13, 1977, pp. 4528-4530, it is disclosed that one mole of cupric (II) ion reacts with two moles of oxalyldihydrazide and six moles of acetaldehyde under oxygen to form a highly stable violet anion with five-coordinate copper (III). FIG. 1 depicts the chemical structure of oxalyldihydrazide (OXDH). Based on crystallographic analyses, the complex anion of five-coordinated copper (III) has the structure depicted in FIG. 2, as reported by G. R. Clark, B. W. Skelton and T. N. Waters, Journal of the Chemical Society, Dalton Transactions, 1528 (1976) and by G. R. Clark, B. W. Skelton and T. N. Waters, Journal of the Chemical Society, Chemical Communications, 1163 (1972). The complexation reaction and resulting violet copper (III) anion were also disclosed by F. A. Cotton and Geoffrey Wilkinson, in "Advanced Inorganic Chemistry, 4$^{th}$ edition," 1980, p. 819.

OXDH is known to be insoluble in liquid hydrocarbons and even in more polar organic liquids like methanol. Accordingly, to date there is no simple and rapid colorimetric test to determine the presence and concentration of copper in a liquid hydrocarbon. It would be beneficial to have such a test, so that copper contamination in liquid hydrocarbons, especially hydrocarbon fuels, can be assessed on-site without elaborate equipment and without specially trained analysts. Such an assessment would inform on-site personnel of a need to institute an adsorption remediation process to remove the copper contamination from the fuel before the fuel is employed in an internal combustion engine, or alternatively, to replace pipes and tanks if sorbent remediation is not possible.

SUMMARY OF THE INVENTION

In one aspect this invention provides for a colorimetric method of detecting copper in a liquid hydrocarbon, the method comprising;
  (a) combining a first aqueous solution with a sample of a liquid hydrocarbon, the first aqueous solution comprising oxalyldihydrazide and an alkaline buffer, so as to form a first biphasic mixture comprising a first aqueous phase and a liquid hydrocarbon phase;
  (b) mixing the first biphasic mixture;
  (c) adding a second aqueous solution comprising an aldehyde to the first biphasic mixture, so as to form a second biphasic mixture comprising a second aqueous phase and the liquid hydrocarbon phase;
  (d) mixing the second biphasic mixture from step (c) for a selected time under conditions sufficient to allow for a color to develop in the second aqueous phase; and
  (e) using the color of the second aqueous phase to determine the presence and concentration of copper in the liquid hydrocarbon sample.

In another aspect this invention provides for a test kit for detecting copper in a liquid hydrocarbon sample, the kit comprising a carton having packaged therein the following materials comprising:
(a) a packet containing oxalyldihydrazide;
(b) a solubilizing reagent comprising an acid;
(c) a first aqueous solution comprising an alkaline buffer;
(d) a second aqueous solution comprising an aldehyde;
(e) a container with removable cap, the container capable of retaining a liquid sample; and
(f) a colorimetric chart illustrating color versus copper concentration.

As a technical advantage, the detection method and test kit of this invention provide for a simple and rapid colorimetric analysis to determine the presence and concentration of copper in a liquid hydrocarbon, preferably, a liquid hydrocarbon fuel.

As another technical advantage, the detection method and test kit of this invention provide for rapid on-site evaluation of copper contamination in a liquid hydrocarbon, cheaply and easily, without a need for elaborate equipment and specialized analysts.

As another technical advantage, the method and kit of this invention provide for easy assessment of copper contamination into the low parts per billion concentration range.

Another technical advantage of the method of this invention is found in the assessment of copper contamination in a liquid hydrocarbon fuel even in the presence of common fuel additives, such as metal deactivating agents.

As yet another technical advantage, with use of the method of this invention, copper contamination is readily assessed and copper removal remediation can be implemented before a contaminated fuel is detrimentally employed in an internal combustion engine.

As yet another advantage, the method of this invention avoids any interference accruing from the yellow color of most hydrocarbon fuels.

DETAILED DESCRIPTION OF THE INVENTION

Figure 1:
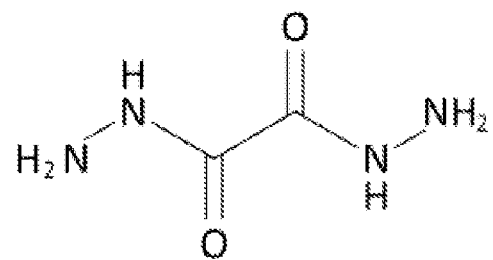
FIG. 1 depicts the chemical structure of oxalyldihydrazide.

In one embodiment, this invention provides for a colorimetric method of detecting copper contamination in a liquid hydrocarbon fuel, the method comprising:
(a) combining a first aqueous solution with a sample of a liquid hydrocarbon fuel, the first aqueous solution comprising oxalyldihydrazide and an alkaline buffer, so as to form a first biphasic mixture comprising a first aqueous phase and a liquid hydrocarbon fuel phase;
(b) mixing the first biphasic mixture;
(c) adding a second aqueous solution comprising an aldehyde to the first biphasic mixture, so as to form a second biphasic mixture comprising a second aqueous phase and the liquid hydrocarbon fuel phase;
(d) mixing the second biphasic mixture from step (c) for a selected time under conditions sufficient to allow for a color to develop in the second aqueous phase; and
(e) using the color of the second aqueous phase to determine the presence and concentration of copper in the sample of liquid hydrocarbon fuel.

The liquid hydrocarbon employed in the detection method of this invention comprises any single hydrocarbon compound or mixture of hydrocarbon compounds that exist in a liquid phase at a temperature ranging from about −40° C. to about +100° C. and at a pressure of about 1 bar (+/−10 percent). The skilled person will appreciate that a hydrocarbon consists of carbon and hydrogen atoms, and will further appreciate that a fuel is any such hydrocarbon compound that is combustible to form carbon dioxide, water, and a variety of partially-oxidized chemical products. More preferably, the liquid hydrocarbon is a liquid hydrocarbon fuel derivable from fossil fuels, crude oil, petroleum refining, plant-based biofuels, or synthetic Fisher-Tropsch or olefin oligomerization processes. Suitable non-limiting examples of the liquid hydrocarbon fuel useful in this invention include C6-24 hydrocarbon compounds, non-limiting examples of which include hexane, octane, decane and dodecane, as well as hydrocarbon mixtures including gasoline, kerosene, diesel, crude oil, and aviation fuels, such as jet propulsion fuels including JP-5, JP-8, JP-10 and Jet A; as well as refinery fractions including, for example, gas oil and FCC light, medium, and heavy oils. In one embodiment the liquid hydrocarbon further comprises one or more oxygenated compounds selected from the group consisting of alcohols, ethers, esters and carboxylic acids, which can be present typically in amounts up to 50 weight percent of the liquid hydrocarbon composition.

In one exemplary embodiment, the liquid hydrocarbon fuel further comprises at least one fuel additive. Typically, a variety of fuel additives are added to a liquid hydrocarbon fuel for the purpose of preserving or enhancing one or more beneficial properties of the fuel. Such additives typically include icing inhibitors, corrosion inhibitors and lubricity enhancers as well as antioxidants, anti-static agents, emulsifiers and biocides. Corrosion inhibitors include metal deactivating (MDA) additives, which are used throughout the fuel industry to chelate copper. One commonly used embodiment of MDAs is N,N'-diisalicylidene-1,2-propanediamine.

The liquid hydrocarbon sample employed in the detection method of this invention may comprise copper, particularly as copper contamination, which may be present in any form, for example, as elemental copper metal, or as copper metal particulates, or as a copper cation of an appropriate positive charge, typically +1, +2 or +3, or as an organo-copper complex wherein copper metal or ion is bonded to an organic compound present in the sample. The concentration of copper in the liquid hydrocarbon sample depends upon the source of the liquid hydrocarbon and on the length of time the liquid hydrocarbon has been stored in copper-containing piping and tanks. In one exemplary embodiment, the copper concentration in the liquid hydrocarbon typically ranges from about 5 parts per billion (5 ppb) to about 5,000 ppb by weight. In another exemplary embodiment, the copper concentration in the liquid hydrocarbon fuel ranges from about 5 ppb up to about 1,000 ppb by weight. In another embodiment, the liquid hydrocarbon contains no detectable copper as determined by the method of this invention.

The quantity of liquid hydrocarbon sample employed in the copper detection method of this invention can be any practical quantity suitable for a lab bench experiment, for example, from about 1 mL to about 100 mL, preferably, from at least about 5 mL to about 20 mL. Other quantities may be equally suitable, as the detection method can be scaled as desired by the person skilled in the field.

A quantity of oxalyldihydrazide (OXDH, see FIG. 1), which is commercially available as a solid powder, having a mass of 118.1 g/mol and a melting point of 242-244° C., is dissolved in water. A solubilizing reagent, more specifically an acid, and suitably any common inorganic acid, such as hydrochloric acid, is employed to facilitate solubilization of the OXDH in water. The invention is not limited to inorganic acids; organic acids that do not interfere in any manner with the detection method of this invention are also suitably employed. A suitable pH ranges from greater than 0 to about 5, preferably from greater than 0 to about 2. The molarity of the OXDH in water suitably ranges from about 0.01 M to about 5.0 M, and preferably, from about 0.05 M to about 1.0 M. For all operations, the water is desirably deionized and, optionally, can also be sterilized. It is desirable to use a freshly-prepared OXDH solution rather than an aged solution.

An aqueous buffer of basic pH (first aqueous solution; or alkaline buffer) is also required for the detection method of this invention. In one embodiment, an ammonium buffer of pH between about 8.0 and 10.0 is suitably employed, with a pH of about 9.0 preferred. The person skilled in the art will know how to make a buffer solution; for example, the ammonium buffer in one embodiment comprises 2 M ammonium chloride and 9 M ammonium hydroxide.

In a first step, the detection method involves combining the aqueous acidic OXDH solution and the alkaline buffer solution with the liquid hydrocarbon sample so as to form a first biphasic mixture comprising a first aqueous phase and a hydrocarbon phase. The order of combining is not critical. In one embodiment, the combining step is accomplished by adding the alkaline buffer solution to the liquid hydrocarbon; or in an alternative embodiment, the reverse by adding the liquid hydrocarbon to the alkaline buffer solution. Typically, the aqueous solution of OXDH is then added, which results in the first biphasic mixture. The first biphasic mixture is thoroughly mixed by stirring, shaking, agitating, or the like at ambient temperature and pressure for a time sufficient to extract any copper content in the liquid hydrocarbon phase into the first aqueous phase. By way of theory, it is believed that the copper is extracted into the first aqueous phase as a complex with the OXDH; although the invention should not be limited by such a theory.

In one illustrative embodiment, the aldehyde comprises a C1-5 aldehyde, suitable non-limiting examples of which include formaldehyde, acetaldehyde, propionaldehyde, butyraldehyde and pentanaldehyde (pentenal, or valeraldehyde). Among these, acetaldehyde and propionaldehyde are preferred. Generally, the aldehyde is provided in an aqueous solution ("second aqueous solution") in a concentration ranging from about 1 percent to about 50 percent aldehyde by volume.

Inasmuch as the stoichiometry of the macrocyclic copper complex formed with oxalyldihydrazide consists of 2 moles OXDH per mole Cu, the OXDH is supplied to the detection method in a quantity providing for a molar ratio of OXDH: Cu of at least about 2:1. An OXDH:Cu molar ratio ranging from about 2.0:1 to 3.0:1 is preferred in one embodiment. Generally, the stoichiometry requires 3 moles aldehyde per mole OXDH. Accordingly, the aldehyde:OXDH molar ratio provided to the test method is at least about 3:1, and preferably between about 3.0:1 and 4.0:1. In any case, an excess each of OXDH and aldehyde should be provided to the test method to ensure conversion of any and all copper species to macrocyclic copper complex.

Figure 2:
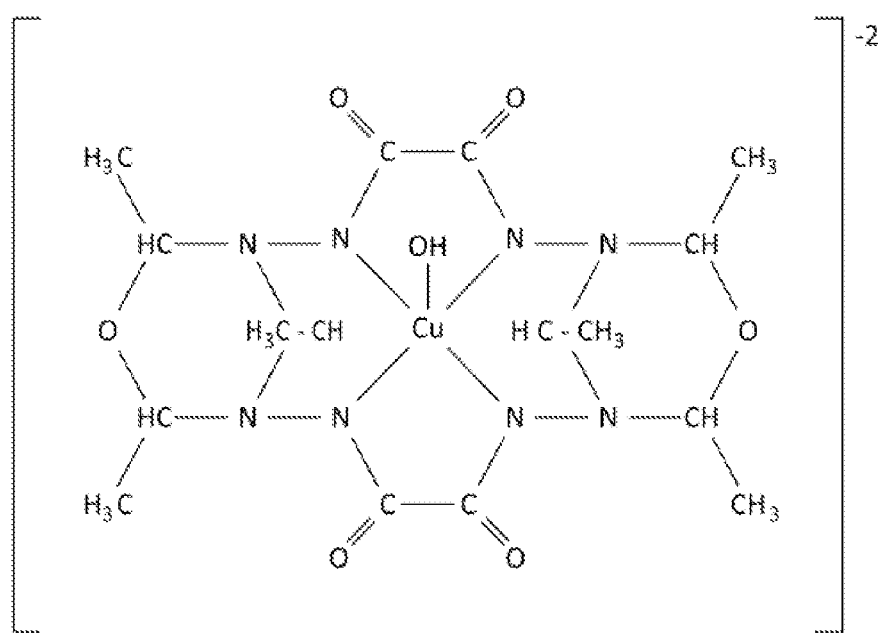
FIG. 2 depicts the chemical structure of a complex anion formed between copper (III) and a reaction product of two moles of oxalyldihydrazide and six moles of acetaldehyde.

The second aqueous solution containing the aldehyde is added to the first biphasic mixture comprised of the liquid hydrocarbon phase and the first aqueous phase of buffered alkaline solution and OXDH. The combined reagents are again mixed for a time sufficient to effect reaction of the aldehyde with the OXDH and subsequent chelation with copper to form the violet-colored copper macro-complex, such as the one depicted in FIG. 2. Mixing times will vary depending upon the scale of the test. For the scale illustrated in this description, shaking for about 0.5 minute to 5 minutes is typically sufficient; for example, vigorous shaking of about 200 times in about 1 minute typically suffices. Optionally, color development can be facilitated by heating the second biphasic mixture to a temperature between about 35° C. and 75° C. After shaking and optional heating, the resulting second biphasic mixture is set aside until two phases are well separated, the liquid hydrocarbon phase and the second aqueous phase comprising the copper macro-complex.

For a simple Pass/Fail test as to whether or not copper is present, the color of the second aqueous phase is observed visually. Any color in the second aqueous phase ranging from pale violet to dark violet confirms the presence of copper; whereas a clear aqueous phase indicates no detectable copper. For a first order estimation of copper concentration, the second aqueous phase is compared to a colorimetric paper strip provided in the test kit of this invention, illustrating a series of typical shades of violet associated with varying concentrations of copper, ranging from greater than zero concentration up to greater than about 1,000 ppb. It should be appreciated that liquid hydrocarbon fuels typically have a yellow color or no color, either of which should not interfere with the development and assessment of the violet color in the second aqueous phase.

In one illustrative embodiment of this invention, if the colorimetric strip is not available, then it is necessary to obtain a standard sample of copper of known concentration, typically dissolved in oil, which can be obtained commercially, for example, from Fisher Scientific. From this sample of known concentration, standard samples of copper of varying known concentration can be prepared in a pure organic solvent, such as dodecane. These standard samples of known copper concentration are then processed in accordance with the detection method of this invention, preferably using the same reagent solutions and temperature and time conditions as are used for the hydrocarbon test sample under consideration. In this manner, a color chart illustrating a shade of violet versus known copper concentration can be obtained for comparison with the test sample, and the copper concentration of the test sample can be determined.

Alternatively, in a second illustrative embodiment of this invention, the second aqueous phase and the standard samples of known copper concentration are analyzed spectrophotometrically on any conventional ultraviolet-visible absorption spectrophotometer. For this analysis, one simply takes a sample of the second aqueous phase in a cuvette and records the absorbance of the violet color at its maximum wavelength in the visible region of the spectrum. Using acetaldehyde, this maximum absorbance occurs at 542 nm. Using propionaldehyde, the maximum occurs at 557 nm. The test sample is typically referenced against a reagent blank containing the buffered aqueous solution of OXDH or against distilled water, both references having essentially no absorption in the 542-557 nm region. The absorption follows the well-known Beer-Lambert Law stating that absorbance is linearly proportional to the concentration of absorbing material in solution. Accordingly, one can measure precisely the concentration of copper by comparing the absorbance of the test sample versus the absorbance of various standard samples of known copper concentration prepared as described hereinabove.

The Beer-Lambert Law is seen in Eqn. 1 below:

$$A=abc \qquad \text{(Eqn. 1)}$$

where "A" is absorbance, "b" is optical path length in cm, "c" is concentration of absorbing species, and "a" is the absorptivity or extinction coefficient of the absorbing species. Accordingly, a graph is prepared plotting absorbance measured as a function of known copper concentration for a series of standardized samples. An example of such absorbance measurements is given in Table 1 for copper concentrations ranging from 20 parts per billion (20 ppb) to 1,000 ppb, with the corresponding graph shown in FIG. 3.

TABLE 1

Absorbances (542 nm) of
Copper Standards in Hydrocarbon[1,2,3]

| Copper (ppb) | Absorbance, 542 nm |
|---|---|
| 20 | 0.023 |
| 60 | 0.034 |
| 100 | 0.044 |
| 200 | 0.068 |
| 500 | 0.158 |
| 1000 | 0.298 |

[1]Absorbance of Cu-OXDH-Acetaldehyde Macrocomplex
[2]Hydrocarbon: Commercial Cu standard (1,000 ppm) in oil, diluted with n-dodecane to listed ppb concentration.
[3]Reference: deionized water or OXDH aqueous buffer solution.

Figure 3:
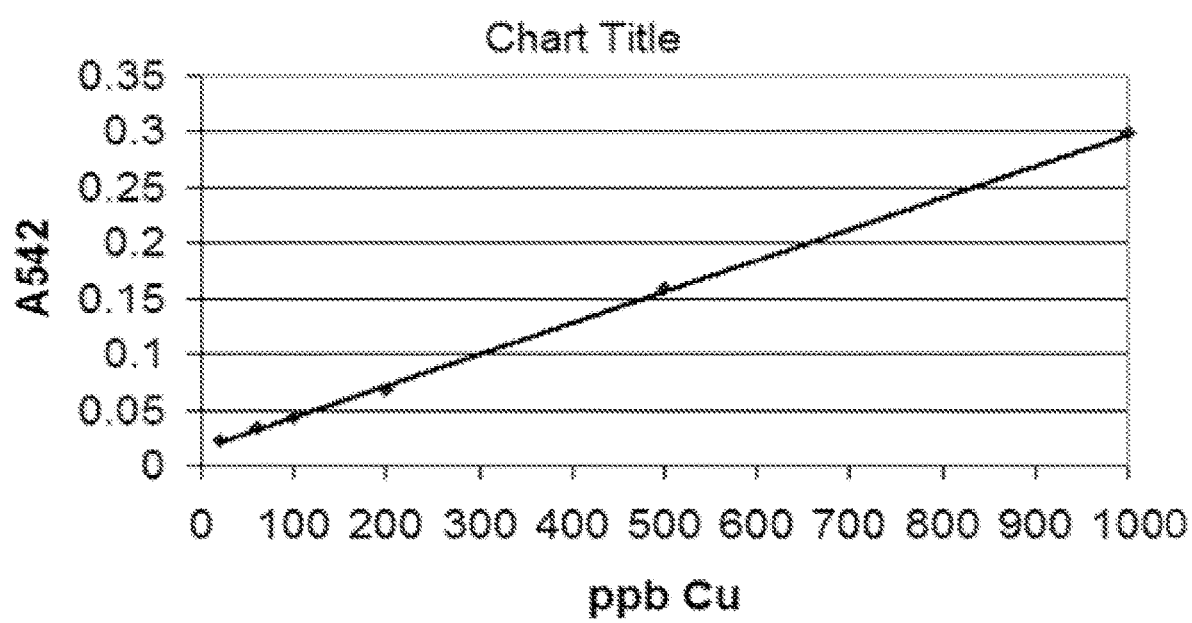
FIG. 3 depicts a graph plotting Absorbance (542 nm) versus Concentration of Copper (parts per billion copper, ppb Cu) for an embodiment of the copper detection method of this invention.

A copper level of 100 ppb produces an absorbance of 0.044, the violet color of which is visually obvious. The absorbance is linear with concentration, as shown in FIG. 3. The slope of the plot gives the absorptivity or extinction coefficient. The plot is used to determine the concentration of copper from the observed absorbance of the test sample, according to Eqn. 2.

$$\text{ppb Cu}=(A-0.01571)/0.282 \qquad \text{(Eqn. 2)}$$

The skilled person will appreciate that the test method of this invention is capable of detecting copper concentrations in liquid hydrocarbons over a wide range from 5 ppb to about 2,000 ppb (2 parts per million, 2 ppm) and higher, for example, up to 5,000 ppb (5 ppm).

The test kit for use in the method of this invention includes (a) a packet containing oxalyldihydrazide (OXDH); (b) a solubilizing reagent comprising the acid; (c) a first aqueous solution comprising the alkaline buffer; (d) a second aqueous solution comprising the aldehyde; (e) a container with removable cap, the container capable of retaining a liquid; and (f) a colorimetric chart illustrating color versus copper concentration. Typically, the OXDH is provided as a powdered or pulverized solid, and its dissolution into the acidic solution and subsequent mixing with the aqueous buffer is prepared fresh before use in the detection method. It should be appreciated that the container may be any conventional size and shape provided that it is capable of holding the liquid sample and test reagents, and provided that it maintains structural integrity on contact with the liquid hydrocarbon. In one embodiment, the container is composed of glass or a plastic compatible with jet fuel, for example, a Teflon™ brand polytetrafluoroethylene. A clear glass container is preferred, for example in one embodiment, a 15-mL clear glass vial with PTFE-lined screw cap.

The following examples are provided to illustrate the copper detection method of this invention, but should not be construed as limiting the invention in any manner.

Example 1 (E-1)

Reagents: The following reagents were obtained and/or prepared: (a) Distilled water, which had not been in contact with copper. (b) OXDH Reagent (Alfa Aesar). Oxalyldihydrazide (500 mg) was weighed into a 50 mL volumetric flask, and then dissolved in and diluted to volume with 0.5M HCl. (c) Ammonium Buffer, pH 10.2: Ammonium chloride (10.70 g) was weighed into a clean, screw-capped bottle (125-250 mL), then dissolved in 50 mL of distilled water. Concentrated ammonium hydroxide (18M, 50 mL) was added. Final Buffer was 2M $NH_4Cl$ in 9M $NH_4OH$. (d) Acetaldehyde Reagent: Alfa Aesar, 40% acetaldehyde in distilled water was prepared cold and stored under refrigeration. (e) Purchased Oil-based Copper Standard, 1000 ppm (Example: LGC Standards, Inc., VHG-OCO-1000-A, Copper Calibration Standard in Hydrocarbon Oil, 1000 µg/g). (f) n-Dodecane, reagent grade.

Preparation of Copper Standards: The copper in oil standard (1,000 ppm) was mixed, then 500 mg were weighed into a screw-capped bottle (100 mL). n-Dodecane was added and then mixed by repeated shaking and inversion to ensure uniformity and to bring the solution mass to 50.00 g. This solution was 10 ppm w/w (10 µg/g) copper standard solution.

Into three 16 mL vials were pipetted 0.1, 0.2, and 0.5 mL, respectively, of the 10 ppm standard copper sample. A sufficient volume of n-dodecane was added to bring the final volume to 10.0 mL (i.e., 9.9, 9.8, and 9.5 mL n-dodecane). These copper standard solutions contained 100, 200, and 500 ppb of copper, respectively, in dodecane solvent.

For each above standard to be used as a reference in a Pass/Fail Test, 5.0 mL solution were pipetted to a clean 16 mL screw-capped vial. These copper standard solutions were tested by the method of this invention in same manner described for fuel test sample hereinbelow.

Test Sample Preparation: Quantitatively pipetted JP-8 fuel sample (5.0 mL) to a clean 16 mL screw-capped vial. Quantitatively transferred the following to the vial: 2.0 mL of distilled water, 0.5 mL of buffer, and 0.2 mL of OXDH reagent solution. The vial was capped and shaken vigorously 200 times (about 1 minute). A resulting first biphasic mixture was allowed to separate into a first aqueous phase and a hydrocarbon phase. Then, the acetaldehyde reagent solution (0.3 mL) was added. The mixture was capped and shaken vigorously again (200 times, about 1 min). The cap was loosened slightly to vent, and the vial was placed in a 60° C. oven for 10 min, resulting in a second biphasic mixture comprising a second aqueous phase and a hydrocarbon phase. A violet color formed in the second aqueous phase. For comparative purposes, the aforementioned procedure employed with the fuel test sample was repeated with each standard sample of known copper concentration prepared as described hereinabove.

Pass/Fail Colorimetric Test: In the pass/fail test, the intensity of any violet color formed in the second aqueous phase for the fuel sample test was visually compared with that formed with the copper standards. Visually, the fuel test sample provided a color closest to the standard sample of 500 ppb copper concentration.

Absorbance: The color intensity of the test sample and each standardized sample was quantified by transferring the aqueous phase of each sample to a 1-cm quartz cuvette. The absorbance was measured on a spectrophotometer (Buck Scientific Company) versus distilled water at 542 nm. Table 1 illustrates the absorbances produced by the 200 ppb, 500 ppb, and 1,000 ppb standard solutions against which the fuel sample was compared.

TABLE 2

Absorbance vs. Copper Concentration

| Standard Samples | Absorbance, 542 nm |
|---|---|
| 200 ppb | 0.068 |
| 500 ppb | 0.158 |
| 1,000 ppb | 0.298 |
| Fuel Sample | 0.143 |

The absorbance was found to be linear with concentration, in accordance with the graph shown in FIG. 3. From the graph, the concentration of copper in the JP-8 fuel test sample was determined to be 472 ppb.

Example 2 (E-2)

A test sample of JP-8 fuel containing roughly 400 ppb Cu was spiked with MDA (27 ppm, Metal Deactivating Agent, N,N'-disalicylidene-1,2-propanediamine), a common copper chelating agent added to jet fuels. A normal level added to JP-8 fuel is 2 ppm MDA; thus the MDA spike in this test sample is roughly 14 times higher than normal. The MDA-spiked JP-8 fuel was evaluated in the manner described in E-1 hereinabove. For comparative purposes, a sample of the JP-8 fuel without the MDA spike was also evaluated. Both samples developed a strong 542 nm color. The MDA-spiked sample exhibited a violet color, but showed a 28 percent reduction in absorbance (A=0.103) as compared with the absorbance shown by the unspiked sample (A=0.143). Thus, even a large excess of MDA over copper (27,000 ppb MDA vs. 400 ppb Cu) did not prevent development of the OXDH-copper complex, and allows for application of the detection method of this invention to be applied to fuel samples containing MDA additive.

Example 3 (E-3)

The detection method of this invention was conducted as described in example E-1 hereinabove on a dodecane solution containing 200 ppb copper, with the exception that a 10 wt. percent aqueous propionaldehyde solution replaced the acetaldehyde solution. Using propionaldehyde as the reactive reagent, a distinctly visible violet color was immediately produced and was clearly visible for four days. The violet color produced by propionaldehyde had a maximum absorbance of 557 nm.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A colorimetric method of detecting copper in a liquid hydrocarbon, the method comprising;
    (a) combining a first aqueous solution with a liquid hydrocarbon sample, the first aqueous solution comprising oxalyldihydrazide and an alkaline buffer, so as to form a first biphasic mixture comprising a first aqueous phase and a liquid hydrocarbon phase;
    (b) mixing the first biphasic mixture;
    (c) adding a second aqueous solution comprising an aldehyde to the first biphasic mixture of step (b), so as to form a second biphasic mixture comprising a second aqueous phase and the liquid hydrocarbon phase;
    (d) mixing the second biphasic mixture from step (c) for a selected time under conditions sufficient to allow for a color to develop in the second aqueous phase; and
    (e) using the color of the second aqueous phase to determine the presence and concentration of copper in the liquid hydrocarbon sample.

2. The colorimetric method in accordance with claim 1 wherein the liquid hydrocarbon exists in a liquid phase at a temperature ranging from −40° C. to +100° C. and a pressure of 1 bar (+/−10 percent).

3. The colorimetric method in accordance with claim 1 wherein the liquid hydrocarbon further comprises one or more oxygenated hydrocarbons selected from the group consisting of alcohol, ethers, esters and carboxylic acids, optionally, in an amount up to 50 weight percent of the liquid hydrocarbon.

4. The colorimetric method in accordance with claim 1 wherein the liquid hydrocarbon comprises a liquid hydrocarbon fuel derivable from fossil fuels, crude oil, petroleum refining, plant-based biofuels, or synthetic Fisher-Tropsch or olefin oligomerization processes.

5. The colorimetric method in accordance with claim 1 wherein the liquid hydrocarbon comprises a liquid hydrocarbon fuel selected from the group consisting of C6-24 hydrocarbon compounds and mixtures thereof including gasoline, kerosene, diesel, crude oil, aviation fuels and refinery fractions.

6. The colorimetric method in accordance with claim 5 wherein the aviation fuel is JP-5, JP-8, JP-10 or Jet A aviation fuel.

7. The colorimetric method in accordance with claim 5 wherein the liquid hydrocarbon fuel further comprises at least one fuel additive selected from the group consisting of icing inhibitors, lubricity enhancers, antioxidants, anti-static agents, emulsifiers, and biocides.

8. The colorimetric method in accordance with claim 1 wherein the copper concentration in the liquid hydrocarbon ranges from greater than the lower limit of detection to 5,000 ppb by weight.

9. The colorimetric method in accordance with claim 1 wherein the liquid hydrocarbon sample is provided in a quantity ranging from 1 mL to 100 mL.

10. The colorimetric method in accordance with claim 1 wherein an aqueous solution of oxalyldihydrazide is prepared in a concentration of 0.01 M to 5 M at a pH ranging from greater than 0 to 5; and said aqueous solution is added to an alkaline buffer solution of pH between 8.0 and 10.0 so as to prepare the first aqueous solution.

11. The colorimetric method in accordance with claim 1 wherein the second aqueous solution comprises a C1-5 aldehyde in a concentration ranging from 1 percent to 50 percent by weight.

12. The colorimetric method in accordance with claim 1 wherein the C1-5 aldehyde is acetaldehyde or propionaldehyde.

13. The colorimetric method in accordance with claim 1 wherein the oxalyldihydrazide is provided in an oxalyldihydrazide-to-copper molar ratio of at least 2:1; and wherein the aldehyde is provided in an aldehyde-to-oxalyldihydrazide molar ratio of at least 3:1.

14. The colorimetric method in accordance with claim 1 wherein the second biphasic mixture of step (d) is mixed for a time ranging from 0.5 minute to 5 minutes, optionally, at a temperature between 35° C. and 75° C.

15. The colorimetric method in accordance with claim 1 wherein the color developed in the second aqueous phase is violet.

16. The colorimetric method in accordance with claim 1 wherein the presence and concentration of copper in the second aqueous phase of step (e) is analyzed by evaluating the color of the second aqueous phase visually or spectroscopically as compared with the color of a standard copper sample treated in accordance with the detection method.

* * * * *